Oct. 21, 1924.
1,512,246
A. J. SLONECKER
UNIVERSAL JOINT
Filed Dec. 20, 1922  2 Sheets-Sheet 2
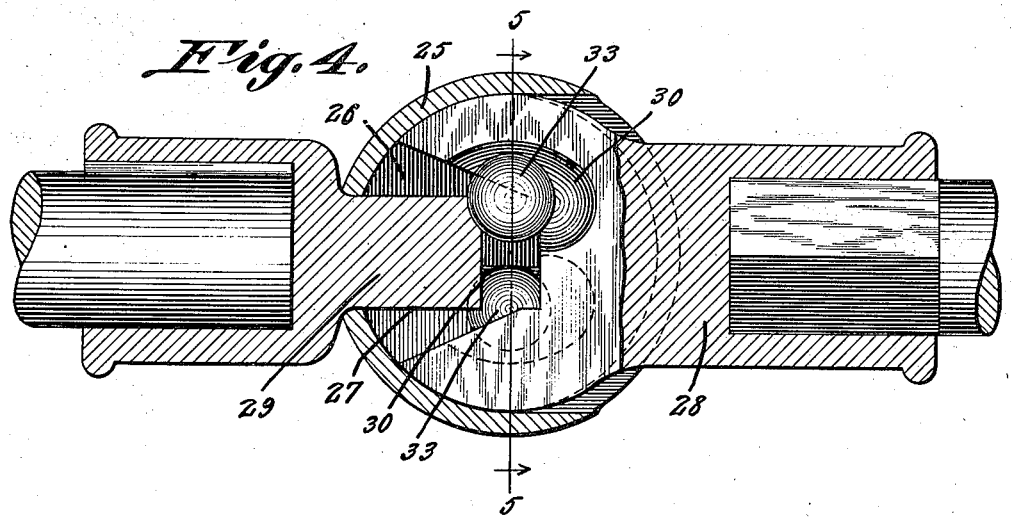
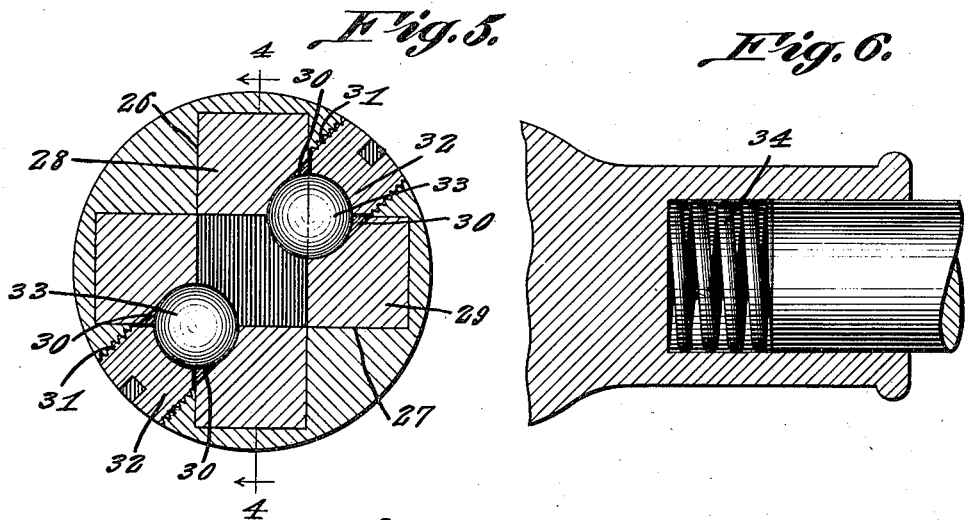
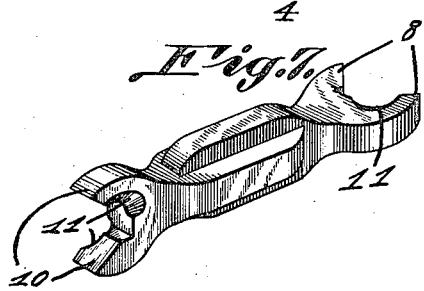

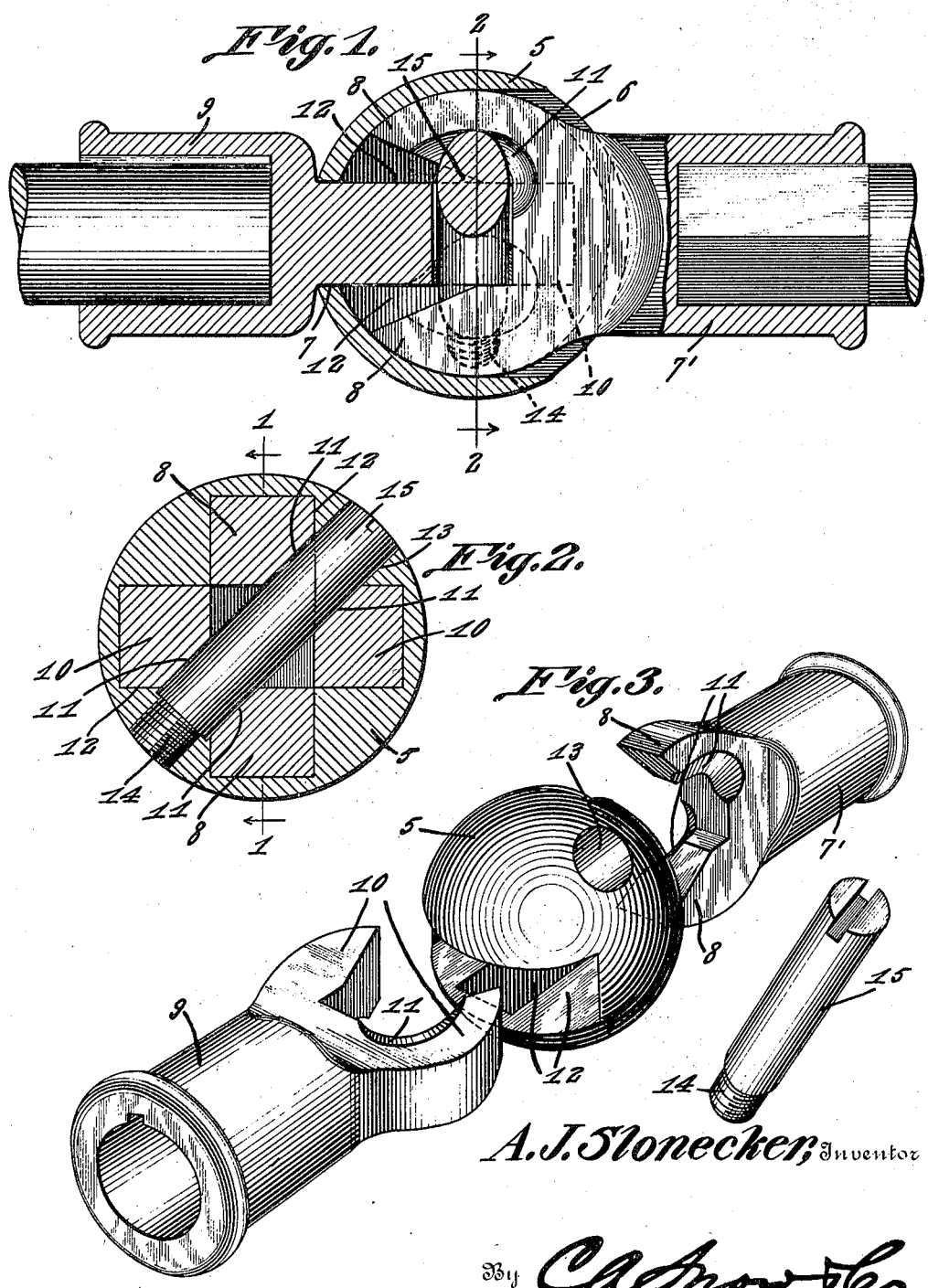

Patented Oct. 21, 1924.

1,512,246

UNITED STATES PATENT OFFICE.

ABIRAM J. SLONECKER, OF TRENTON, MISSOURI, ASSIGNOR TO SLONECKER PRODUCTS COMPANY, OF TRENTON, MISSOURI.

UNIVERSAL JOINT.

Application filed December 20, 1922. Serial No. 608,032.

*To all whom it may concern:*

Be it known that I, ABIRAM J. SLONECKER, a citizen of the United States, residing at Trenton, in the county of Grundy and State of Missouri, have invented a new and useful Universal Joint (Case 1), of which the following is a specification.

This invention has reference to universal joints, and aims to provide a universal joint constructed of comparatively few parts and one which will act readily and easily, due consideration being given to the strength and durability of the joint.

The primary object of the invention is to provide a universal joint wherein the sections thereof may be readily and easily connected or disconnected to facilitate the repairing of the joint when the same becomes broken or otherwise rendered inoperative.

A further object of the invention is to provide a universal joint wherein the body portion thereof will constitute a housing for containing grease or other lubricant to supply the movable elements of the joint.

A still further object of the invention is to provide a universal joint construction wherein the sections may be reversed to change the wearing surfaces thereof, thereby greatly increasing the durability of the joint.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a longitudinal sectional view through a universal joint constructed in accordance with the present invention.

Figure 2 is a sectional view taken on line 2—2 of Figure 1.

Figure 3 is a perspective view disclosing the elements prior to assembling the same.

Figure 4 is a longitudinal sectional view through a modified form of the invention.

Figure 5 is a sectional view taken on line 5—5 of Figure 4.

Figure 6 is a fragmental detail view disclosing the shaft receiving end of one of the sections.

Figure 7 is a perspective view disclosing the principle of the invention as applied to a link, of a flexible shaft construction.

Referring to the drawings in detail, the reference character 5 designates the body portion of the universal joint which is in the form of a hollow ball formed with a cut out portion 6 disposed at one side thereof, and a cut out portion 7 disposed on the opposite side thereof and extending in a direction opposite to the first mentioned cut out portion.

The reference character 7' designates one of the sections of the universal joint, which has a bifurcated extremity providing arms 8, the outer surfaces thereof being curved to conform to the curvature of the inner surface of the body so that movement of the bifurcated end within the body may be permitted, but lateral movement thereof restricted.

Cooperating with the section 7' is a section 9 which is also formed with a bifurcated extremity providing arms 10 that are designed to be positioned between the arms 8 of the section 7' at right angles thereto. Each of the arms of each section is formed with an inclined surface 11, the inclined surfaces being disposed on opposite sides of the arms of each section to provide a continuous opening when the sections 7' and 9 are brought together to a position as shown by Figure 1 of the drawings.

Grooves 12 are provided in the body which grooves accommodate the inner ends of the extensions 7' and 9 as clearly shown by Figure 2 of the drawings. An opening indicated at 13 extends through the body portion and aligns with the continuous opening formed by the inclined surfaces of the arms. As shown, threads are provided at one end of the opening 13 to accommodate the reduced threaded end 14 of the pin 15 which is of a length to extend through the opening and engage the arms of the sections 7' and 9 to hold them in assembled positions, the ends of the pin however, being curved to conform to the contour of the body portion 5.

In the form of the invention as shown by Figures 4 and 5 of the drawings, the body portion which is indicated at 25 is in the form of a hollow ball provided with grooves 26 and 27 respectively, the grooves 26 being designed to accommodate the section 28 of the connection, while the grooves 27 are designed to accommodate the inner end of the section 29.

Each of these sections is formed with a depression 30, which depressions are formed in opposite sides thereof and align with the openings 31, the walls of which are threaded to accommodate the plugs 32 which may be positioned within their openings to contact with the balls 33 and hold them in position.

These balls 33, are held in position by the plugs 32, and act as keys to secure the sections 28 and 29 together in a manner as does the pin 15, as shown by Figure 1.

From the foregoing it will be seen that due to this construction the sections may move laterally with respect to the body, in one direction, but prevented from movement in the opposite direction.

As shown by Figure 6 each section may be formed with a hollow end to accommodate one end of a shaft associated therewith, a coiled spring indicated at 34 being disposed between one wall of the hollow end and shaft associated therewith to normally exert a pressure on the section to hold the sections in close engagement with each other. When this form of connection is used the use of a pin or other connecting means is unnecessary.

It might be further stated that links such as shown by Figure 7 of the drawings, may be employed in a flexible shaft construction, it being obvious that by connecting the bifurcated ends of adjacent link sections in a manner as shown by Figures 1 and 5 of the drawings, the links may move freely with respect to each other.

What is claimed is:—

1. In a universal joint, opposed sections, each of the sections having a bifurcated extremity providing arms, a body portion having oppositely disposed cut out portions to receive the arms, said body portion having an opening extending therethrough, said opening extending at an angle with respect to the arms when the arms are positioned in the body portion, a pin adapted to be secured in the opening and adapted to engage the bifurcated ends of the sections to hold the sections within the body portion, and means for securing the pin to the body portion.

2. In a universal joint, opposed sections, each of said sections having a bifurcated end providing arms, one arm of each section having a cut away portion to provide an inclined surface, a body portion having cut out portions to receive the bifurcated ends of the sections, said body having an opening, a pin adapted to extend through the opening and engage the inclined surfaces of the arms to secure the arms within the body portion, and means for securing the pin within its opening.

In testimony that I claim the foregoing as my own, I have hereto affixed my signature in the presence of two witnesses.

ABIRAM J. SLONECKER.

Witnesses:
I. E. SIMPSON,
AGNES ROCKELLI.